US010267294B2

(12) United States Patent
Chapman

(10) Patent No.: US 10,267,294 B2
(45) Date of Patent: Apr. 23, 2019

(54) SPRING RETURN DEVICE

(71) Applicant: KINETROL LIMITED, Surrey (GB)

(72) Inventor: Roger Charles Chapman, Surrey (GB)

(73) Assignee: KINETROL LIMITED, Surrey (GB)

( * ) Notice: Subject to any disclaimer, the term of this patent is extended or adjusted under 35 U.S.C. 154(b) by 139 days.

(21) Appl. No.: 15/196,568

(22) Filed: Jun. 29, 2016

(65) Prior Publication Data
US 2017/0002798 A1 Jan. 5, 2017

(30) Foreign Application Priority Data

Jul. 1, 2015 (GB) .................................. 1511518.1

(51) Int. Cl.
*F03G 1/08* (2006.01)
*F16K 17/04* (2006.01)

(52) U.S. Cl.
CPC ............... *F03G 1/08* (2013.01); *F16K 17/04* (2013.01); *F03G 2730/03* (2013.01)

(58) Field of Classification Search
CPC .... F16F 1/10; F16F 1/121; F16F 1/122; F16F 1/123; F03G 1/08; F03G 1/00; F03G 2730/03; F16K 17/04
See application file for complete search history.

(56) References Cited

U.S. PATENT DOCUMENTS

| 3,994,368 | A | * | 11/1976 | Langwell ................. F03G 1/00 185/11 |
| 4,523,395 | A | * | 6/1985 | Borsoi ................. A43B 5/0441 36/117.5 |
| 5,195,721 | A | * | 3/1993 | Akkerman ............ F16D 27/105 192/56.1 |
| 9,151,351 | B2 | | 10/2015 | Underwood, Jr. et al. |
| 2011/0051565 | A1 | | 3/2011 | Schmiedchen |

FOREIGN PATENT DOCUMENTS

GB          1 573 240        10/1997

OTHER PUBLICATIONS

GB Search Report Under Section 17, Application No. GB1511518.1, dated Oct. 26, 2016, 2 pages.

* cited by examiner

*Primary Examiner* — Marina A Tietjen
(74) *Attorney, Agent, or Firm* — Stephen J. Weyer, Esq.; Stites & Harbison, PLLC

(57) ABSTRACT

A spring return device comprising a rotatable drive coupling configured for releasably engaging a rotatable drive part on a first side of the device and configured for releasably engaging a rotatable drive part on an opposite second side of the device; a spring engaged with the drive coupling; and a retainer that retains the spring; wherein: rotation of the drive coupling in a first direction relative to the retainer causes mechanical energy to be stored in the spring; and the spring return device comprises an integral locking mechanism that is actuatable between a first state in which rotation of the drive coupling relative to the retainer is allowed and a second state in which rotation of the drive coupling relative to the retainer is prevented.

28 Claims, 6 Drawing Sheets

SPRING RETURN DEVICE

The present invention relates to a spring return device. The present invention also relates to an apparatus including the spring return device, and to a method of reversing the direction of the spring return device in the apparatus.

Spring return devices are used as mechanical fail-safe devices. They are used to return mechanical devices, for example a valve, to a pre-determined safe condition using mechanical energy stored in a spring, typically a rotary spring such as a clock-spring.

A typical spring return device as conventionally used comprises a rotatable shaft, a clock-spring engaged with the rotatable shaft, and a retaining band surrounding the clock-spring and secured to the clock-spring by a retaining screw. When the rotatable shaft is rotated in a first direction relative to the retaining band, the clock-spring is wound up within the retaining band so that it stores mechanical energy and provides a torque on the rotatable shaft that acts to rotate the rotatable shaft in an opposite second direction. Thus, the effect of the clock-spring is to provide a force on the rotatable shaft that acts to counteract rotation of the rotatable shaft in the first direction.

In practice, a spring return device is typically used to apply a torque to rotate a rotatable shaft of a mechanical device, such as a valve, back to a predetermined position when the rotatable shaft is rotated away from the predetermined position to change an operational state of the mechanical device. In such an arrangement, the rotatable shaft of the spring return device is coupled to the rotatable shaft of the mechanical device, so that rotation of the rotatable shaft in the first direction causes mechanical energy to be stored in the clock-spring and a corresponding torque to be applied to the rotatable shaft that acts to rotate it in the second direction back to a predetermined position.

In practice, the predetermined position of the rotational shaft corresponds to a predetermined safe or desired operational state of the mechanical device, for example a position at which a valve is open or closed (depending on the particular circumstances).

Commonly, a spring return device is used in conjunction with a rotary actuator, such as an electric, pneumatic or hydraulic powered rotary actuator.

Rotary actuators are used to control the operation of mechanical devices by applying a torque to rotate a rotatable shaft of the mechanical device, e.g. to open or close a valve. For example, when a pneumatic rotary actuator is provided with a pressurised air supply, the pneumatic rotary actuator will provide a torque to rotate a shaft of the mechanical device to change an operational state of the mechanical device (e.g. to open or close a valve).

A spring return device can be used in conjunction with a powered rotary actuator to provide automatic return of the mechanical device controlled by the powered rotary actuator to a predetermined safe or desired condition in the event of the interruption or failure of power (e.g. electrical power, pneumatic power or hydraulic power) to the powered rotary actuator.

In the absence of a spring return device, in the event of unexpected interruption of power to the powered rotary actuator, for example in the event of the interruption of a pressurised air supply to a pneumatic rotary actuator, the mechanical device will stay in the operational state it was in at the time of the interruption. This operational state may be an unsafe or undesirable operational state of the mechanical device.

To overcome this problem, it is known to provide a spring return device in conjunction with the powered rotary actuator to provide a torque to return the rotatable shaft of the mechanical device to an orientation that corresponds to a predetermined safe or desired condition of the mechanical device in the event of interruption of power to the powered rotary actuator. Thus, the spring return device acts as a fail-safe device that prevents the mechanical device from remaining in an unsafe or undesirable operational state in the event of interruption of power to the powered rotary actuator.

Typically, the spring return device is positioned between the powered rotary actuator and the mechanical device with the rotatable shaft of the spring return device coupled to both a rotatable driver shaft of the powered rotary actuator and a rotatable driven shaft of the mechanical device. Thus, when sufficient power is supplied to the rotary actuator, the driver shaft, the rotatable shaft of the spring return device, and the driven shaft are rotated in the first direction to change an operational state of the mechanical device, for example to open a valve. This rotation is against the torque provided by the clock-spring, and power must be continually provided to the powered rotary actuator to balance the torque provided by the clock-spring to maintain the driven shaft in the desired orientation.

In the event of interruption of power to the powered rotary actuator, the torque provided by the clock-spring will no longer be balanced by the powered rotary actuator, and therefore this torque will rotate the rotatable shaft of the spring return device, the driver shaft and the driven shaft in the second direction to change the operational state of the mechanical device to a predetermined state. Thus, the spring return device acts as a mechanical fail-safe device that returns the mechanical device to a predetermined state in the event of interruption of the supply of power to the powered rotary actuator.

Typically, it is desirable for the clock-spring of a spring return device to store a minimum amount of mechanical energy even when the rotatable shaft of the spring return device is at the predetermined position. This is commonly referred to as the spring preload.

Inadvertent release of energy stored in the spring (including the spring preload), such as a sudden popping out of the spring during assembly or disassembly, can cause serious injury to personnel or damage to equipment.

In some situations, it can be advantageous to reverse a direction of operation of a spring return device. In other words, it can be advantageous to reverse a direction of the torque applied to the rotational shaft of the mechanical device by the spring return device, for example from a clockwise direction to an anticlockwise (counter-clockwise) direction.

WO2013/008066 describes a method for reversing the direction of operation of a conventional spring return device. This method involves removing the mechanical energy stored in the spring before disengaging the retained spring from the rotatable shaft, removing the retained spring from the housing, inverting the retained spring, re-inserting the retained spring back in the housing including re-engaging the retained spring with the rotatable shaft, and storing mechanical energy in the spring. In this manner, the direction of operation of the spring return device is reversed.

The present inventor has realised that the method for reversing the direction of operation of a spring return device disclosed in WO2013/008066 includes a large number of time consuming steps, including removing the mechanical energy stored in the spring, disassembling the spring return device, and reassembling the spring return device. In particular, removing the mechanical energy stored in the spring includes repeating a sequence of numerous time consuming steps multiple times in order to gradually reduce the mechanical energy stored in the spring, until all of the spring tension has been released, so that the spring can safely be removed from the housing to be inverted with minimal risk to personnel and equipment.

The present inventor has realised that these time consuming steps can be avoided by providing a spring return device that has an integral locking mechanism that can be actuated to lock the rotatable part of the spring return device in position so that it can no longer rotate.

Thus, the spring return device can be safely disengaged from a rotatable drive part (e.g. a drive shaft) without any risk of the stored mechanical energy in the spring being suddenly released. Furthermore, the direction of operation of the spring return device can easily be reversed by locking the rotatable part of the spring return device in position so that the spring is fixed in a strained configuration in which it stores mechanical energy, disengaging the spring return device from the drive part, inverting the whole spring return device, re-engaging the spring return device with the drive part, and unlocking the rotatable part. Since it is not necessary to remove the spring from the spring return device in order to reverse the direction of operation of the spring return device, it is not necessary to perform the time consuming steps of removing the mechanical energy stored in the spring, disassembling the spring return device, and reassembling the spring return device, as in the method disclosed in WO2013/008066.

Therefore, at its most general the present invention relates to a spring return device that can be coupled to a rotatable drive part (for example a rotatable shaft) on either of two opposite sides of the device and that has an integral locking mechanism that can be actuated to lock the rotatable part of the spring return device in position so that it cannot rotate.

According to a first aspect of the present invention there is provided a spring return device comprising:

a rotatable drive coupling configured for releasably engaging a rotatable drive part on a first side of the device and configured for releasably engaging a rotatable drive part on an opposite second side of the device;

a spring engaged with the drive coupling; and a retainer that retains the spring;

wherein:

rotation of the drive coupling in a first direction relative to the retainer causes mechanical energy to be stored in the spring; and the spring return device comprises an integral locking mechanism that is actuatable between a first state in which rotation of the drive coupling relative to the retainer is allowed and a second state in which rotation of the drive coupling relative to the retainer is prevented.

The integral locking mechanism of the spring return device according to the first aspect of the present invention can be actuated to lock the drive coupling in position so that it cannot rotate relative to the retainer. Therefore, the drive coupling can be locked in position while the spring stores mechanical energy, so that the spring is unable to release the mechanical energy by rotating the drive coupling. Thus, the spring can be prevented from releasing its stored mechanical energy when the spring return device is disengaged from the rotatable drive part, so that the safety of the spring return device is improved.

Furthermore, the direction of operation of the spring return device can be easily and safely reversed by locking the drive coupling in position, disengaging the drive coupling from the rotatable drive part, inverting the whole spring return device, re-engaging the drive coupling with the rotatable drive part, and subsequently unlocking the drive coupling. Thus, it is possible to reverse the direction of operation of the spring return device without it being necessary to remove the mechanical energy stored in the spring.

The spring return device according to the first aspect of the present invention may have any one, or, to the extent they are compatible, any combination of the following optional features.

The term rotatable drive coupling may mean a rotatable part of the spring return device that is configured, adapted or arranged for releasably engaging the rotatable drive part.

The drive coupling may have a female coupling part, for example an opening or a bore, for receiving a rotatable drive shaft. Alternatively, or in addition, the drive coupling may have a male coupling part, for example a protrusion or a shaft, for being received in an opening or a bore of a rotatable drive part.

The rotatable drive coupling may be rotatable around a central axis thereof.

The term rotatable drive part may mean any part that is rotatable and that can be used as part of a drive system for driving rotation of a mechanical device such as a valve. The rotatable drive part may have a male coupling part, for example a protrusion or a shaft, for being received in a corresponding female coupling part of the drive coupling. For example, the rotatable drive part may be a rotatable shaft, such as a rotatable driver shaft of an actuator, which is typically used to drive rotation of a driven shaft of a mechanical device, or a driven shaft of a mechanical device, which is typically rotationally driven by a driver shaft of an actuator. Alternatively, the rotatable drive part may have a female coupling part, for example an opening or bore, for receiving a corresponding male coupling part of the drive coupling.

Thus, a rotatable drive part may mean a rotatable part having a male or female coupling part or portion.

The rotatable drive part may be part of an actuator for driving rotation of the drive coupling, or part of a mechanical device for being driven by rotation of the drive coupling. Alternatively, the rotatable drive part may be an intermediate part that rotationally couples the drive coupling to the actuator or to the mechanical device. For example, the rotatable drive part may be a rotatable part of an adaptor for converting a female coupling part of the drive coupling to a male coupling part, or for converting a male coupling part of the drive coupling to a female coupling part. The adaptor may also, or alternatively, change a size and/or shape of the coupling part.

Releasable engagement between the drive coupling and the rotatable drive part means that the rotatable drive coupling rotates together with the rotatable drive part and can be disengaged (i.e. separated) from the rotatable drive part. For example, this may be achieved through the engagement of male and female coupling parts, and/or by the coupling part and the rotatable drive part having one or more mutually cooperating surfaces The engagement between the spring and the drive coupling is such that the spring can apply a torque to the drive coupling. For example, the spring may be coupled to, or fixed to, or abut part of, or be received within part of the drive coupling. Typically an end of the spring will be engaged with a side surface of the drive coupling, for example a circumferential surface of the drive coupling. It is possible for the drive coupling to have only a single engagement part on its circumferential surface. However, it is preferable for the drive coupling to have a plurality of engagement parts on its circumferential surface. Preferably, the drive coupling has three engagement parts. Providing multiple engagement parts is advantageous because it allows for finer setting of the spring torque. For example, providing three engagement parts allows for finer setting of the spring torque than providing only a single engagement part.

In the present invention the engagement part only needs to be able to engage the spring in one direction, e.g. engage the end of the spring when it presses in the clockwise direction, or engage the end of the spring when it presses in the anticlockwise direction. Thus, in the present invention the engagement part may be a single-sided, one-direction or one-way engagement part that is configured to engage an end of the spring in one direction only. For example, the engagement part may comprise a raised or recessed edge or wall configured to abut an end of a spring pressing in the specified direction. In contrast, in WO2013/008066 the engagement parts comprise multiple double-sided slots that are configured to engage the end of the spring in both the clockwise and anticlockwise directions. This is because the technique disclosed in WO2013/008066 relies on rotating the spring in the housing and keeping the coupling in the same position, therefore requiring a double sided slot to engage the end of the spring in both directions. In contrast, in the present invention a two-way engagement of the end of the spring is not necessary, because the end of the spring always locates on one side of the engagement part only.

Providing a one-way engagement part may make the drive coupling simpler to manufacture, e.g. to cast from metal, and therefore quicker and cheaper to manufacture.

The engagement part may be an indent or a protrusion in the circumferential surface of the drive coupling that is abutted by an end surface of the spring to engage the spring with the drive coupling, or another type of single-sided, one-direction or one-way engagement part or catch.

Alternatively, the engagement part may be a two-direction engagement part. For example, the engagement part may be in the form of a slot for receiving an end part of the spring.

The term retainer may mean a part of the spring return device that functions to retain, or hold, or restrain, or house the spring. The retainer may prevent rotation of the whole of the spring relative to the retainer, so that the spring can be wound up within the retainer to store mechanical energy.

Rotation of the drive coupling relative to the retainer may mean that the drive coupling rotates while the retainer does not rotate.

The term integral may mean that the locking mechanism is a part of a main body of the spring return device in both the first and second states. The locking mechanism may not be detachable from the spring return device in normal use of the spring return device, for example when locking or unlocking the spring return device.

The term mechanism may mean that there are two or more parts that interact to achieve the locking function.

The term actuatable may mean that a part of the locking mechanism is moveable to change the locking mechanism between the first and second states.

The rotatable drive coupling may be able to releasably engage a drive part on the first side of the device and able to releasably engage a drive part on the second side of the device regardless of the state of the locking mechanism. In other words, the locking mechanism may not interfere with the ability of the rotatable drive coupling to engage a rotatable drive part on either side of the device in either the first or second state.

The locking mechanism may comprise a locking member that rotates with the drive coupling, and a locking element that is releasably engageable with the locking member to prevent rotation of the locking member.

Thus, the drive coupling may be prevented from rotating relative to the retainer by the locking element being engaged with the locking member. The engagement may be any interaction or coupling between the locking element and the locking member that prevents rotation of the locking member.

The locking element may prevent rotation of the locking member only in a second direction opposite to the first direction. This is the direction in which the torque applied on the drive coupling by the spring acts, so preventing rotation in this direction prevents the spring from being able to release its stored mechanical energy by rotating the drive coupling. Alternatively, the locking element may prevent rotation of the locking member in both the first and second directions. In other words, the drive coupling may be completely prevented from rotating.

The locking member may comprise a locking plate. The locking plate may be substantially circular. The locking plate may be substantially flat. The locking plate may be arranged so that the rotatable drive coupling is substantially at a centre of the locking plate. The locking plate may surround the rotatable drive coupling. The locking plate does not obstruct the drive coupling, so that the drive coupling is able to releasably engage the rotatable drive part. The locking plate may have a central hole in which the drive coupling is received.

The locking member may have an opening, and the locking element may be releasably engageable with the locking member by the locking element being moveable to be received in the opening. Thus, the locking member may be prevented from rotating by the locking element being received in the opening, for example so that it abuts an edge of the opening. The locking element may protrude into the opening. In other words, only part of the locking element may be received in the opening.

The opening may comprise a hole or a slot in the locking member in which the locking element is receivable.

The locking member may have a plurality of openings in which the locking element is receivable. Therefore, it may be possible to prevent rotation of the drive coupling with the drive coupling held/locked at any one of a plurality of different rotational positions.

Where the locking member is a locking plate, the plurality of openings may be arranged around a periphery of the locking plate. For example, where the plate is a circular plate, the plurality of openings may be evenly spaced around a circular periphery of the locking plate. For example, there may be four openings arranged at 90 degree intervals around the periphery of the locking plate.

The locking member may be at an axial end of the spring return device.

The locking element may comprise a locking pin or a locking tab, or another protrusion.

The locking element may be mounted on the retainer. Thus, the locking element may be mounted at a periphery of the spring return device. Mounted may mean that the locking element is connected (directly or indirectly) to the retainer.

The integral locking mechanism may comprise a locking element actuator mounted on the retainer for actuating the locking element to engage the locking member. The locking element actuator may be moveable to move the locking element to engage the locking member.

The locking element actuator may be rotatable to move the locking element in an axial direction to engage the locking member. Thus, the locking element can be made to engage the locking member and therefore prevent rotation of the drive coupling relative to the retainer by rotating the locking element actuator.

The locking element actuator may comprise a rotatable shaft having an eccentric protrusion at an end thereof that is received in a slot of the locking element, whereby rotation of the rotatable shaft causes axial movement of the locking element. An eccentric protrusion means an off-centre protrusion. The slot in the locking element may be perpendicular to a direction in which the locking element is moved to engage the locking member. The locking element may be constrained to only be able to move in the direction necessary to engage the locking member.

At least part of the locking element actuator may be exposed at a side face of the retainer so that it is operable by a user of the spring return device. Thus, a user of the spring return device can easily operate the locking element.

The retainer may comprise a band, ring, or housing substantially surrounding the spring. The retainer may therefore substantially surround an outer circumference of the spring, i.e. the spring may be located inside the retainer. Thus, the retainer may contain the spring, i.e. prevent the spring from expanding outwards. The retainer holds the spring to prevent rotation of the whole spring relative to the retainer, so that the spring can be wound up within the retainer. The retainer may be substantially circular/cylindrical. The retainer may have one or more mounting parts for fixing the retainer to an actuator or to a mechanical device. The retainer may be a spring housing in which the spring is housed (received). The retainer may be substantially rigid, e.g. so that it cannot be easily deformed. The retainer may be made of metal and may be made by casting or molding.

The retainer may comprise a spring retaining screw that is engageable with the spring to retain the spring. Thus, the spring retaining screw may fix the spring to the retainer so that the whole spring cannot rotate within the retainer, so that the spring can be wound up within the retainer.

The drive coupling may be configured for engaging the same rotatable drive part on the first and second sides of the device. Therefore, the drive coupling can engage the same rotatable drive part when the drive coupling is inverted. Thus, the direction of operation of the spring return device can easily be reversed by inverting the spring return device while the drive coupling is locked in position.

However, it is not essential for the drive coupling to be configured for engaging the same rotatable drive part on the first and second sides of the device. Instead, the drive coupling may be configured for engaging different (for example different sizes and/or shapes) drive parts on the first and second sides, and one or more adaptors may be provided for coupling the drive coupling to the different drive parts when the device is inverted. For example, the adaptor may convert a female coupling part having a first size bore to female coupling part having a second size bore, or a female coupling part to a male coupling part.

However, it is advantageous for the drive coupling to be configured for engaging the same rotatable drive part on the first and second sides of the device, because this simplifies the device and the process of inverting the device. Where the device is coupled to both a driver part of an actuator and a driven part of a mechanical device, this requires either that coupling portions of the driver part and the driven part are the same (i.e. the same size and shape), or that one or more adaptors are provided that convert a coupling portion of one or both of the driver part and the driven part so that they have the same (size and shape) coupling portion, so that they can both be engaged on either side of the drive coupling.

The drive coupling may have a coupling part on the first side thereof for releasably engaging a rotatable drive part and a coupling part on the second side thereof for releasable engaging a rotatable drive part. The coupling parts may be linked/connected, or may be distinct coupling parts.

The coupling parts on the first and second sides may be substantially the same (e.g. substantially the same shape and/or size). As mentioned above, this means the spring return device can quickly and easily be inverted. As mentioned above, one or more adaptors may be provided for converting one or more of the coupling parts from a first size and/or shape to a second size and/or shape in order to couple the coupling part to the rotatable drive part. The adaptor may also, or alternatively, convert the coupling part from a male coupling part (e.g. a protrusion or a shaft) to a female coupling part (e.g. an opening or a bore), or from a female coupling part to a male coupling part, in order to couple the coupling part to the rotatable drive part.

The drive coupling may be for releasably coupling a rotatable driver part to a rotatable driven part. A rotatable driver part may be a rotatable part of an actuator for driving rotation of a rotatable driven part of a mechanical device. A rotatable driven part may be a rotatable part of a mechanical device for being driven by a rotatable driver part of an actuator.

The first coupling part may comprise a first opening for engaging a drive shaft, and the second coupling part may comprise a second opening for engaging a drive shaft. The opening may engage the drive shaft by the drive shaft being received in the opening and contacting a side wall of the opening. The opening and the drive shaft may have mutually cooperating surfaces that directly transmit rotation of the opening to the drive shaft, for example mutually cooperating shapes. In some embodiments a single bore may extend through the whole width of the drive coupling between the first and second surfaces to provide the first and second openings. In other embodiments, the first and second openings may be separate, for example distinct bores.

The spring may comprise a helical torsion spring. Thus, the spring will store mechanical energy when it is wound up by rotation of the drive coupling.

The spring may comprise a clock-spring. A clock-spring may mean a spiral-wound torsion spring.

The spring may comprise a band of resilient metal wound into a spiral shape.

According to a second aspect of the present invention there may be provided an apparatus comprising:

the spring return device according to the first aspect of the present invention optionally with one or more of the optional features disclosed above; and a further device comprising a rotatable drive part, wherein the drive part is engaged with the drive coupling of the spring return device.

Thus, the spring return device will act as a fail-safe spring return that acts to return the rotatable drive part of the further device to a predetermined condition (rotational position) when the rotatable drive part is rotated away from the predetermined condition.

The further device may be a driver mechanism having a rotatable driver part. Thus, the rotatable drive part may be a rotatable driver part of the driver mechanism. A driver mechanism may be any apparatus or device for driving rotation of the rotatable driver part, for example the driver mechanism may be an actuator, such as a rotary actuator.

The driver mechanism may comprise a powered rotary actuator. A rotary actuator is an actuator for causing rotation of a shaft. The rotary actuator may be manually powered, e.g. via a handle for applying a torque, or may be electrically, pneumatically, or hydraulically powered. When power is provided to the rotary actuator, the rotary actuator provides a torque to the rotatable drive part, and therefore to the drive coupling, that acts to rotate the drive coupling in a first direction against the torque provided by the spring. While sufficient power is supplied to the rotary actuator to balance the torque provided by the spring, the rotatable drive part and the drive coupling will remain in the same orientation. When the power to the rotary actuator is interrupted, the torque provided by the spring will cause the rotatable drive part and the drive coupling to rotate in an opposite second direction, to return the rotatable drive part and the drive coupling to a predetermined configuration.

The powered rotary actuator may comprise a pneumatic rotary actuator, or an electrical rotary actuator, or a hydraulic rotary actuator.

Alternatively, the driver mechanism may comprise a manually operated rotary actuator, for example that has a handle for a user to apply a torque to the rotatable driver part.

The apparatus may further comprise a mechanical device having a rotatable driven part, wherein the rotatable driven part is engaged with the drive coupling on an opposite side of the device to the rotatable driver part, so that the rotatable driver part and the rotatable driven part are coupled by the drive coupling.

Thus, the spring return device may act to return the rotatable driven part of the mechanical device to a predetermined rotational position when the rotatable driven part is rotated away from the predetermined rotational position. The predetermined rotational position may correspond to a safe or desired configuration of the mechanical device, for example a configuration in which a valve is open or closed.

The rotatable driven part may be directly coupled to the drive coupling. Alternatively, the rotatable driven part may be engaged with the drive coupling through a rotatable connecting part that is coupled to the rotatable driven part and to the drive coupling.

The rotatable driven part may be engaged with the drive coupling through an adaptor that converts a male coupling part (e.g. a protrusion or shaft) of the drive coupling to a female coupling part (e.g. an opening or bore), or a female coupling part of the drive coupling to a male coupling part, or a male coupling part of the drive coupling to a male coupling part having a different size and/or shape, or a female coupling part of the drive coupling to a female coupling part having a different size and/or shape.

Of course, the rotatable driver part of the actuator may also be engaged with the drive coupling through such an actuator or other intermediate rotary part.

According to a third aspect of the present invention, there is provided a method of reversing the direction of a spring return device in an apparatus according to the second aspect of the present invention, optionally with one or more of the optional features disclosed above, wherein the method comprises:

actuating the locking mechanism from the first state in which rotation of the drive coupling relative to the retainer is allowed to the second state in which rotation of the drive coupling relative to the retainer is prevented;

disengaging the rotatable drive part from the drive coupling;

inverting the spring return device so that an opposite side of the spring return device faces the further device;

engaging the rotatable drive part with the drive coupling; and actuating the locking mechanism from the second state to the first state.

Thus, the direction of operation of the spring return device can easily and safely be reversed by inverting the entire spring return device while the drive coupling is locked in position by the locking mechanism. Thus, it is not necessary to release the mechanical energy stored in the spring to invert the spring return device.

Where the apparatus comprises the mechanical device, the method may further comprise: after actuating the locking mechanism from the first state to the second state and before inverting the spring return device, disengaging the rotatable driven part from the drive coupling; and after inverting the spring return device and before actuating the locking mechanism from the second state to the first state, engaging the rotatable driven part with the drive coupling.

Embodiments of the present invention will now be discussed, by way of example only, with reference to the accompanying Figures, in which.

Figure 1:
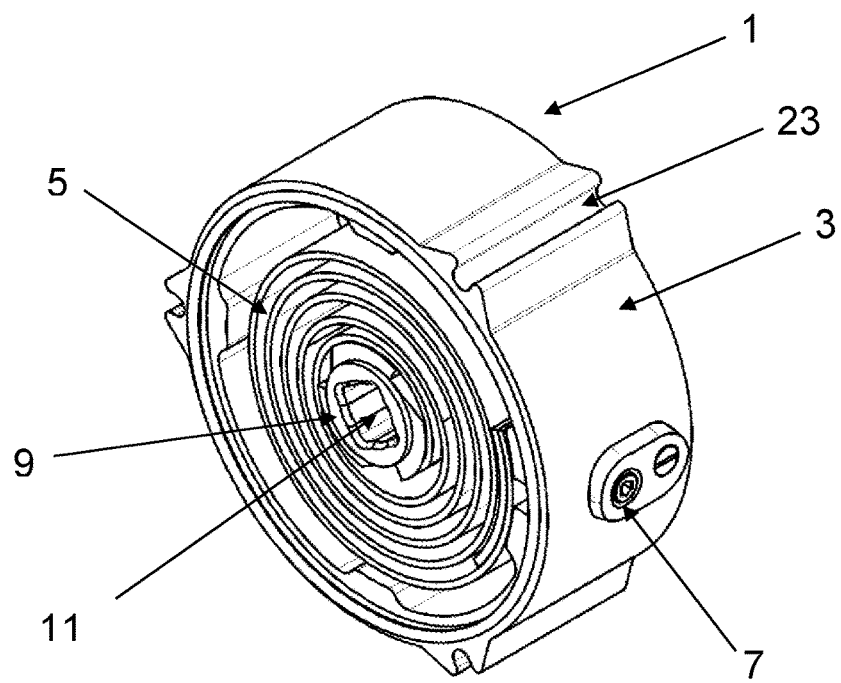
FIG. 1 is a view of a back side of a spring return device according to an embodiment of the present invention.
Figure 2:
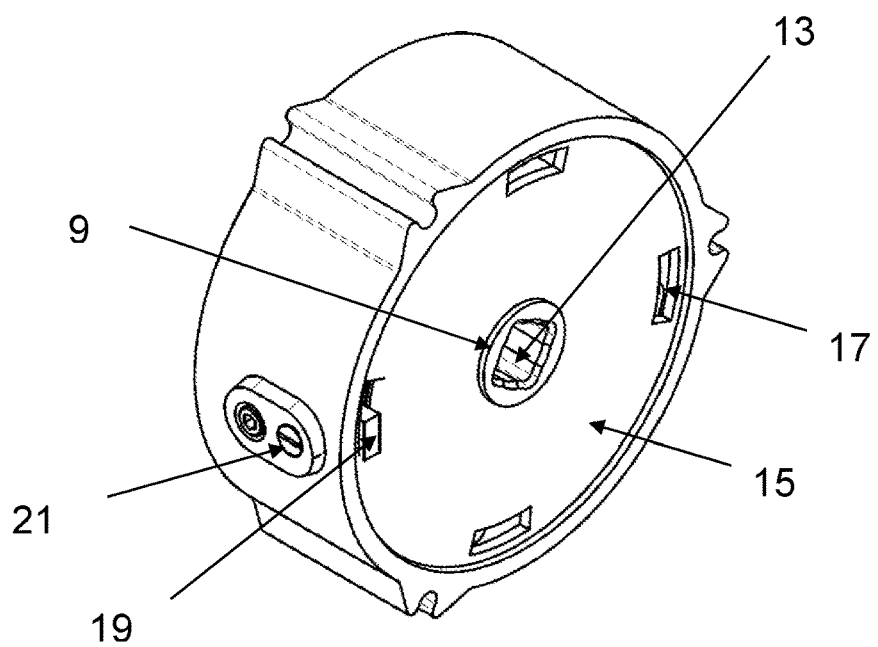
FIG. 2 is a view of a front side of the spring return device shown in FIG. 1.

FIGS. 1 and 2 respectively show rear and front views of a spring return device 1 according to an embodiment of the present invention. The spring return device 1 comprises a cylindrical spring housing 3 (a "retainer") in which is housed a clock-spring 5. The spring housing 3 is generally in the form of a ring, or cylindrical section. The spring housing 3 is substantially rigid, e.g. it cannot be easily deformed. The spring housing 3 is made of metal and may be made by casting, for example. For example, the spring housing 4 may be case as a single piece from metal.

The clock-spring 5 is formed from a band of resilient metal bent into a helical shape. An outer surface of the clock-spring 5 is fixed to the spring housing 3 by a retaining screw 7, which extends through a threaded portion of the spring housing 3 from an outside thereof to the inside thereof where it engages the clock-spring 5. The retaining screw 7 can be adjusted from an outside of the spring housing 3, for example if a user wants to disengage the retaining screw 7 from the clock-spring 5 to disassemble the device 1.

A rotatable drive coupling 9 is positioned at a centre of the spring housing 3. The drive coupling 9 is rotatable relative to the spring housing 3. In other words, the drive coupling 9 can be rotated while the spring housing 3 remains stationary.

As shown in FIGS. 1 and 2, the drive coupling 9 has a first opening 11 on one side of the device 1 for releasably engaging a rotatable shaft. The drive coupling 9 also has a second opening 13 on an opposite side of the device 1 for releasably engaging a rotatable shaft. These openings 11, 13 are discussed below.

The clock-spring 5 is engaged with a side of the drive coupling 9. Specifically, an end of the clock-spring 5 abuts an engagement part on the side of the drive coupling 9 so that when the drive coupling 9 is rotated in a first direction (clockwise in the rear view of FIG. 1, anticlockwise in the front view of FIG. 2) the clock-spring is wound up within the spring housing 3 and stores mechanical energy. The engagement part on the side of the drive coupling 9 may be a surface (e.g. a side or edge surface) of an indent or a protrusion on the side of the drive coupling 9. The engagement part is a single-sided, one-way or one-direction engagement part that engages the end of the clock-spring 5 in a single direction only, for example in the clockwise direction or in the anti-clockwise direction. For example, the engagement part may be a raised or recessed edge or wall for abutting an end of the clock-spring in the single direction. In this embodiment there are three such engagement parts. However, in other embodiments there may be a different number of engagement parts.

When wound up in this way, the clock-spring applies a torque to the drive coupling 9 in a second direction (anti-clockwise in the rear view of FIG. 1, clockwise in the front view of FIG. 2) that acts to rotate the drive coupling 9 in the second direction (unless this torque is balanced by a corresponding torque in the first direction). The clock-spring 5 therefore acts to resist rotation of the drive coupling 9 in the first direction.

As shown in FIG. 2, the device 1 has a locking plate 15 at an axial end of the device 1. The locking plate 15 is a circular plate that surrounds the second opening 13 of the drive coupling 9 and that extends to adjacent an inner edge of the spring housing 3. In other words, an outer diameter of the locking plate 15 is similar to (or substantially equal to) an inner diameter of the spring housing 3. The locking plate 15 may be integral with the drive coupling 9, or may be fixed or engaged with the drive coupling 9. The locking plate 15 rotates together with the drive coupling 9. In other words, the drive coupling 9 and the locking plate 15 rotate as one. The locking plate 15 does not obscure the second opening 13, and therefore does not interfere with the ability of the device 1 to releasably engage a rotatable drive part through the second opening 13.

As shown in FIG. 2, the locking plate 15 has a plurality of slot openings 17 arranged around the periphery thereof. In total, there are four slot openings 17 equally spaced around the periphery of the locking plate 15 at an angular spacing of 90 degrees.

As shown in FIG. 2, a locking tab 19 is received in one of the openings 17 and abuts the edge of the opening 17. Thus, the locking tab 19 prevents rotation of the locking plate 15 in the second direction (clockwise in FIG. 2) relative to the spring housing 3, which is the direction in which the torque provide on the drive coupling 9 by the clock-spring 5 acts. Since the locking plate 15 and the drive coupling 9 rotate as one, the drive coupling 9 is also prevented from rotating in the second direction by the locking tab 19 acting on the locking plate 15. The interaction of the locking tab 19 and the locking plate 15 will also prevent rotation of the locking plate 15 in the first direction when they are engaged as shown in FIG. 2.

The locking tab 19 is actuatable to move forwards and backwards in the axial direction of the device 1 by rotation of a locking tab actuator 21, which extends through the spring housing 3 from an outside thereof where it can be operated by a user to the inside thereof where it is coupled to the locking tab 19. A specific mechanism by which rotation of the locking tab actuator 21 is converted into axial movement of the locking tab 19 is discussed below.

The locking tab screw actuator 21, the locking tab 19, and the locking plate 15 are parts of an integral locking mechanism of the device 1, that can be actuated between a locked state in which rotation of the driver coupling 9 relative to the spring housing 3 is prevented and an unlocked state in which rotation of the drive coupling 9 is allowed.

From the configuration (a locked state) shown in FIG. 2, the locking tab actuator 21 can be rotated to move the locking tab 19 in the axial direction away from the locking plate 15, so that the locking tab 19 is no longer received in the slot opening 17. Then, the locking plate 15 and the drive coupling 9 will be free to rotate relative to the spring housing 3, and in the absence of a torque acting in the first direction the torque provided by the strained spring 5 will rotate the drive coupling 9 in the second direction back to a predetermined position.

Conversely, from an unlocked configuration (an unlocked state) the locking tab actuator 21 can be rotated in the opposite direction to move the locking tab 19 in the axial direction towards the locking plate 15 so that the locking tab 19 is received in one of the slot openings 17. The locking plate 15 and drive coupling 9 will then be prevented from rotating relative to the spring housing 3. The locking plate 15 can be locked in any one of four different rotational positions by the locking tab 19 being received in any one of the four openings 17.

As shown in FIGS. 1 and 2, the device 1 also has axial channels 23 on the outer surface of the spring housing 3 for receiving screws or bolts for securing the device 1 to an actuator and/or to a mechanical device. In this embodiment there are three such axial channels 23. Of course, in other embodiments a different number of such axial channels 23 may be provided on the outer surface of the spring housing 3.

Figure 3:
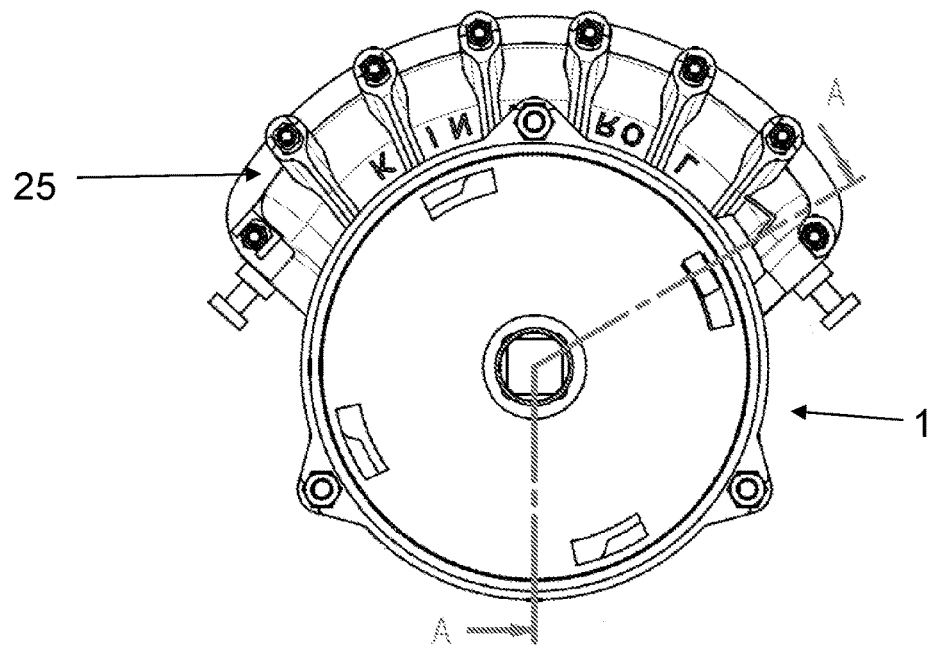
FIG. 3 is a plan view of the spring return device shown in FIG. 1 connected to a powered rotatory actuator.
Figure 4:
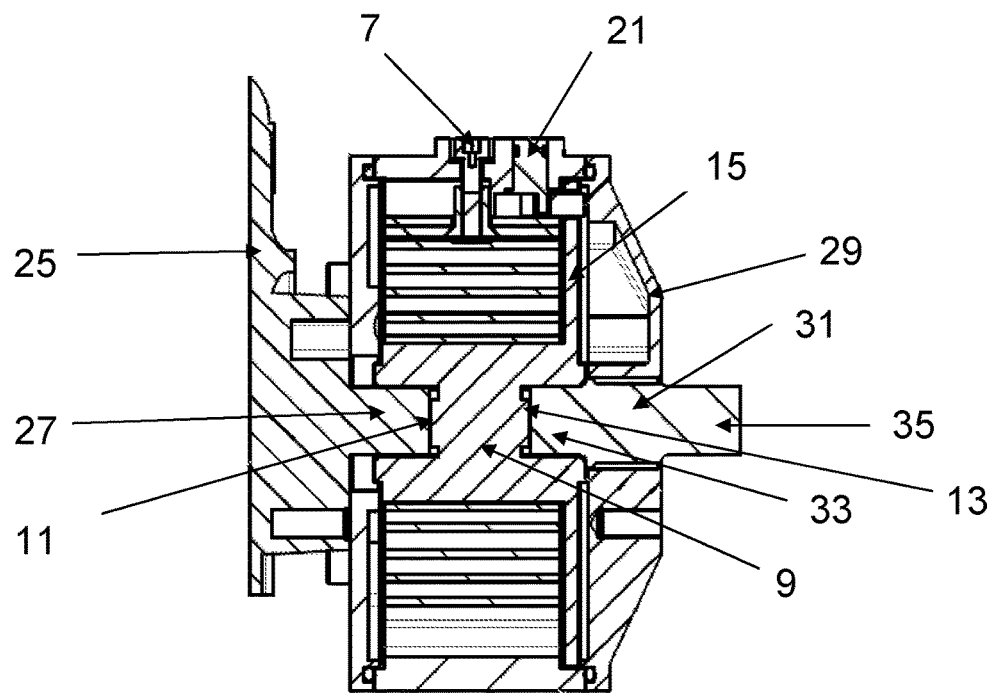
FIG. 4 is a cross-sectional view along A-A in FIG. 3 with the addition of an adaptor for converting a female coupling part of the spring return device to a male coupling part.

FIG. 3 shows a plan view of the spring return device 1 fixed to a powered rotary actuator 25. FIG. 4 is a cross-sectional view along A-A in FIG. 3, with the addition of an adaptor for converting a female coupling part of the spring return device 1 to a male coupling part.

The powered rotary actuator 25 is a device that causes rotation of a rotary driver shaft 27 using some form of power, for example electrical power, pneumatic power or hydraulic power. The powered rotary actuator 25 provides a torque on the rotary driver shaft 27 while power is supplied to the rotary power actuator 25.

As shown in FIG. 4, the rotary driver shaft 27 of the powered rotary actuator 25 is engaged with the drive coupling 9 of the device 1 by the rotary driver shaft 27 being received in the first opening 11 of the driver coupling 9. The engagement is such that any torque applied to the rotary driver shaft 27 is also applied to the drive coupling 9. As shown in FIG. 3, this is achieved by the rotary driver shaft 27 and the first opening 11 having cooperating shapes.

As shown in FIG. 4, the device 1 is also coupled to an adaptor 29 on an opposite side of the device 1 to the powered rotary actuator 25. The adaptor 29 is configured to convert the second opening 13 of the drive coupling 9 (a female coupling part) to a rotatable shaft coupling part (a male coupling part). Thus, the adaptor 29 can then be engaged with a mechanical device that requires a male coupling part input to its drive mechanism. This is achieved by the adaptor having a rotatable connector 31 which at a first end has a first male coupling part (i.e. a shaft) 33 for engaging the second opening 13 of the drive coupling 9 and at a second end has a second male coupling part 35 (i.e. a second shaft) for being coupled to the drive mechanism of a mechanical device. The size and/or shape of the second male coupling part 35 may be different to the size and/or shape of the first male coupling part 33, and is chosen depending on the drive mechanism of the mechanical device to which the second male coupling part 35 is to be engaged.

As shown in FIG. 4, the first and second openings 11, 13 of the drive coupling 9 have the same size and shape, i.e. they are corresponding or equivalent openings. The end of the rotary driver shaft 27 and the end of the first male coupling part 33 also have the same size and shape, and this size and shape cooperates with the size and shape of the openings 11, 13 so they can be engaged with the openings. Thus, as discussed below, the rotary driver shaft 27 can be engaged with either of the openings 11, 13 and the first male coupling part 33 can also be engaged with either of the openings 11, 13. However, it is not essential for the end of rotary driver shaft 27 and the end of the first male coupling part 33 to be identical. For example, the lengths of the end of the rotary drive shaft 27 and the end of the first male coupling part may be different, for example for strength reasons.

When in the unlocked state, when the actuator 25 is actuated in the configuration shown in FIG. 4 the rotary driver shaft 27 is rotated in the first direction (the top moves out of the page in FIG. 4). The drive coupling 9 and the rotatable connector 31 are also rotated in the first direction. Thus, mechanical energy is stored in the spring 5 and the spring 5 provides a torque on the drive coupling 9 in the second direction. While power is provided to the actuator 25, the torque provided by the spring is balanced by the torque provided by the actuator 25. If the power supplied to the actuator 25 is interrupted, the torque provided by the spring will rotate the drive coupling 9 and therefore also the rotary driver shaft 27 and the rotatable connector 31 in the second direction. Thus, the spring return device 1 acts as a fail-safe device to reset the rotatable connector 31 to a predetermined condition if power is interrupted to the actuator 25. Similarly, if the device 1 was suddenly disengaged from the actuator 25, the spring 5 would violently discharge its stored energy by freely rotating the drive coupling 9.

By rotating the locking tab actuator 21, the locking tab 19 can be moved axially to be received in a slot opening 17 of the locking plate 15. Thus, the drive coupling 9 and therefore the rotary driver shaft 27 and the rotatable connector 31 are prevented from rotating. In this locked state, the device 1 can be safely disengaged from the actuator 25 and the adaptor 29 with no risk of the energy stored in the spring 5 being violently discharged.

The device 1 can then be inverted (flipped 180 degrees) so that the second opening 13 faces the actuator 25 and so that the first opening 11 faces the adaptor 29.

Since the first and second openings 11, 13 have the same size and shape, and the coupling part of the rotary driver shaft 27 and the first male coupling part have the same size and shape, the first opening 11 can be engaged with the first male coupling part 33 and the second opening 13 can be engaged with the rotary driver shaft 27.

Figure 5:
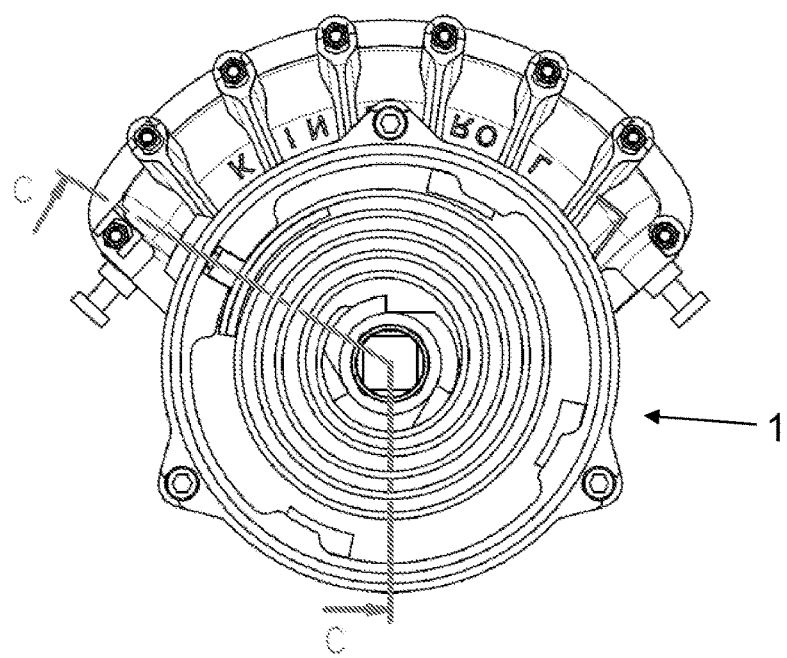
FIG. 5 is a plan view of the spring return device shown in FIG. 1 connected to a powered rotatory actuator with the spring return device inverted.
Figure 6:
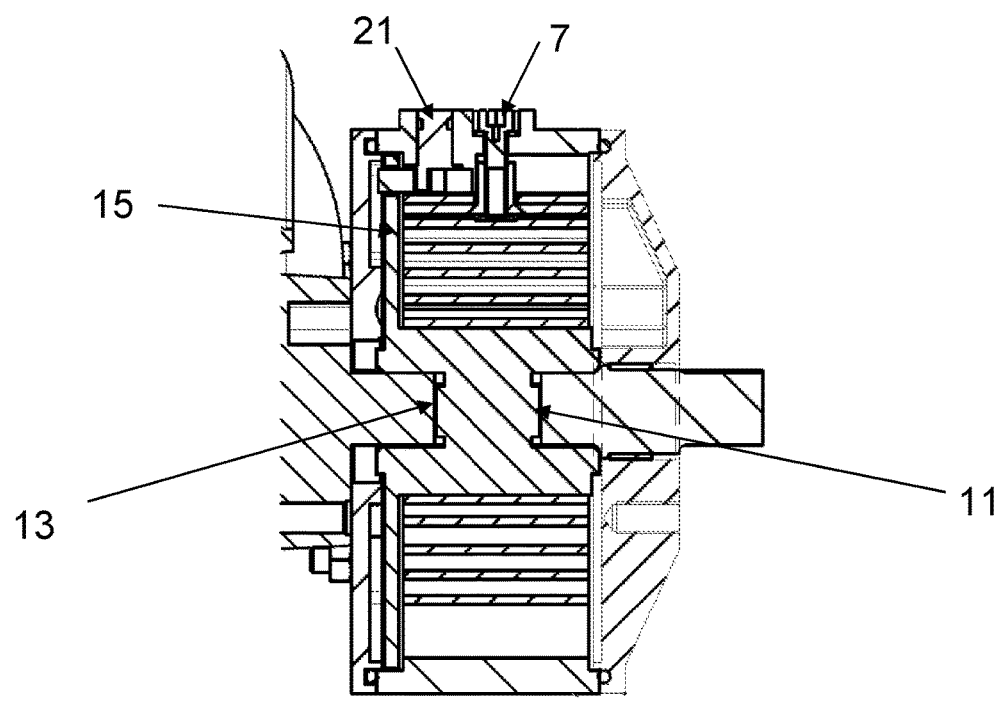
FIG. 6 is a cross-sectional view along C-C in FIG. 5 with the addition of an adaptor for converting a female coupling part of the spring return device to a male coupling part.

In this reversed or inverted configuration, which is shown in FIGS. 5 and 6, the direction of action of the spring 5 in the device 1 is in the opposite direction to the configuration shown in FIGS. 3 and 4. In other words, in the configuration shown in FIG. 5 the spring 5 provides a torque in the anticlockwise direction (the first direction) when the drive coupling 9 is rotated in the clockwise direction (the second direction).

Thus, the direction of operation of the device 1 can easily and safely be reversed by locking the drive coupling 9 in position, disengaging the drive coupling 9 from the actuator 25 and adaptor 29, inverting the device 1, re-engaging the drive coupling 9 with the actuator 25 and adaptor 29, and unlocking the drive coupling 9. Because of the locking mechanism, this reversal can be safely carried out while the spring stores mechanical energy.

Figure 7A:
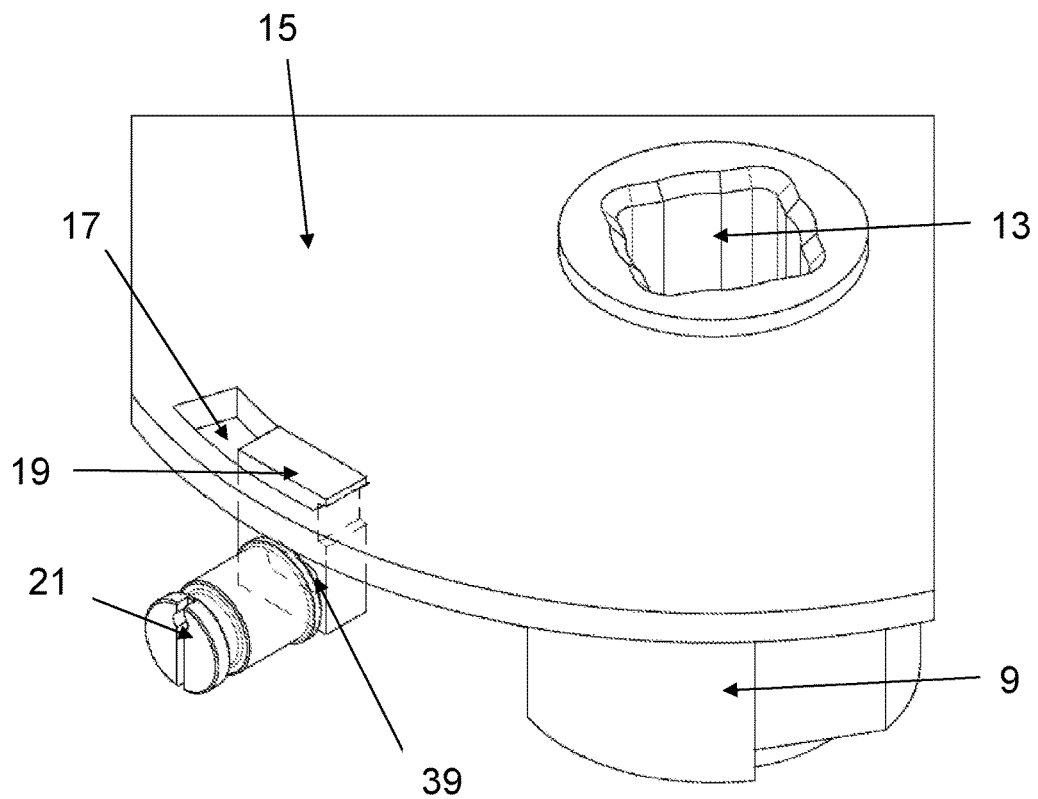
FIGS. 7A and 7B are close up views of a locking mechanism of a spring return device according to an embodiment of the present invention with the locking plate locked in position.
Figure 7B:
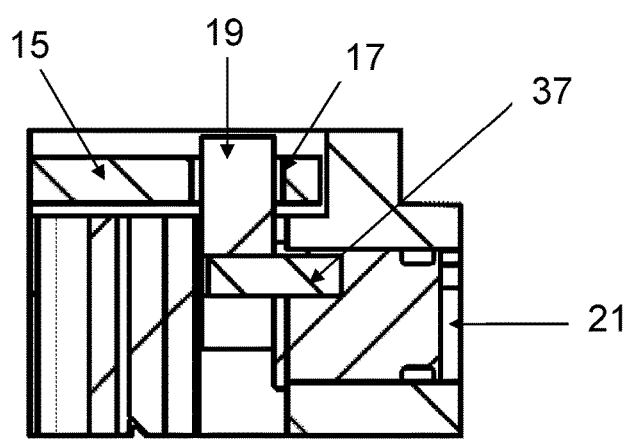
Figure 8A:
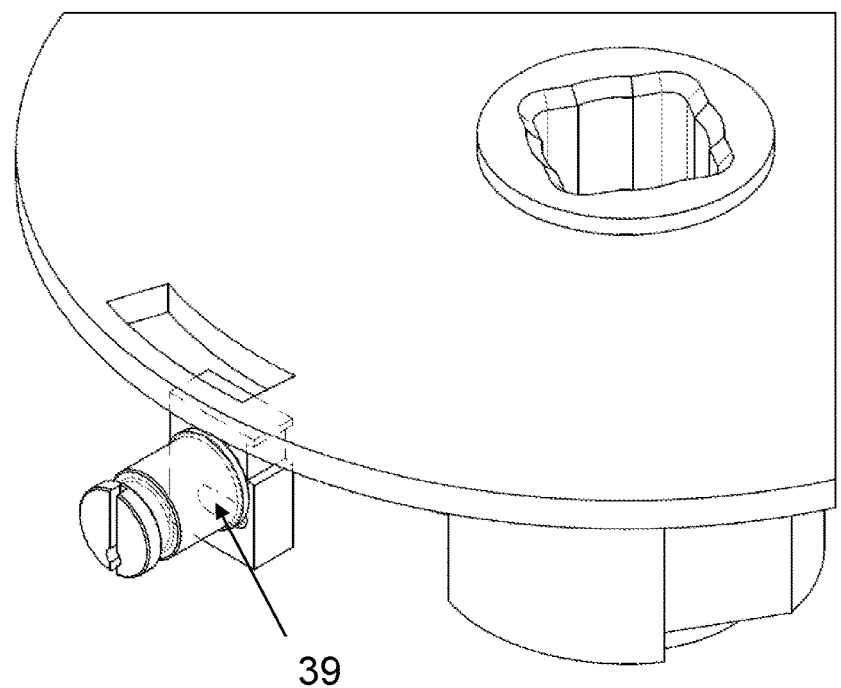
FIGS. 8A and 8B are close up views of the locking mechanism shown in FIGS. 7A and 7B with the locking plate not locked in position.
Figure 8B:
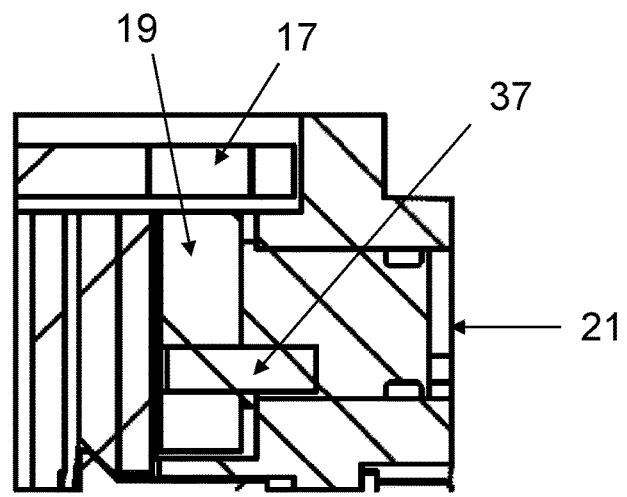

The structure of the locking mechanism is shown in more detail in FIGS. 7A to 8B. FIGS. 7A and 7B show the locked state, whereas FIGS. 8A and 8B show the unlocked state.

As shown in FIGS. 7A to 8B, the locking tab actuator 21 has an eccentric (off-centre) protrusion 37 at the end thereof. The protrusion 37 is received in a horizontal (perpendicular to the axial direction) slot 39 in the locking tab 19. The locking tab 19 is constrained to only be able to move in the axial direction of the device 1.

When the locking tab actuator 21 is rotated, the axial position of the eccentric protrusion 37 changes. Since the eccentric protrusion 37 is received in the horizontal slot 39 in the locking tab 19, axial movement of the eccentric protrusion 37 causes corresponding axial movement of the locking tab 19. At the same time, rotation of the locking tab actuator 21 causes the eccentric protrusion 37 to move along the horizontal slot 39.

In the locked state shown in FIGS. 7A and 7B the locking tab actuator 21 has been rotated so that the eccentric protrusion 37 is at its closest position to the locking plate 15. In this configuration the locking tab 19 has been displaced axially towards the locking plate 15 by the axial movement of the eccentric protrusion 37 so that the locking tab 19 protrudes into one of the slot openings 17 in the locking plate 15. Thus, the locking plate 15 and therefore the drive coupling 9 are prevented from rotating relative to the spring housing 3.

In contrast, in the unlocked state shown in FIGS. 8A and 8B the locking tab actuator 21 has been rotated so that the eccentric protrusion 37 is at its furthest position from the locking plate 15. In this configuration, the locking tab 19 has been displaced axially away from the locking plate 15 so that it is no longer received in the slot opening 17 in the locking plate 15. Thus, the locking plate 15 and therefore the drive coupling 9 are free to rotate.

Therefore, the spring return device 1 can be easily changed between an unlocked state in which rotation of the drive coupling 9 relative to the spring housing 3 is allowed and a locked state in which rotation of the drive coupling 9 relative to the spring housing 3 is prevented by rotation of the locking tab actuator 21. This can easily be achieved by a user of the device accessing the locking tab actuator 21 from the outside of the spring housing 3. Thus, the device 1 can easily be changed to a locked state in which the spring 5 is unable to release its stored mechanical energy by rotating the coupling device, so that the device can be safely disengaged from the actuator 25 for inverting the device 1 to change a direction of operation of the device.

Figure 9:
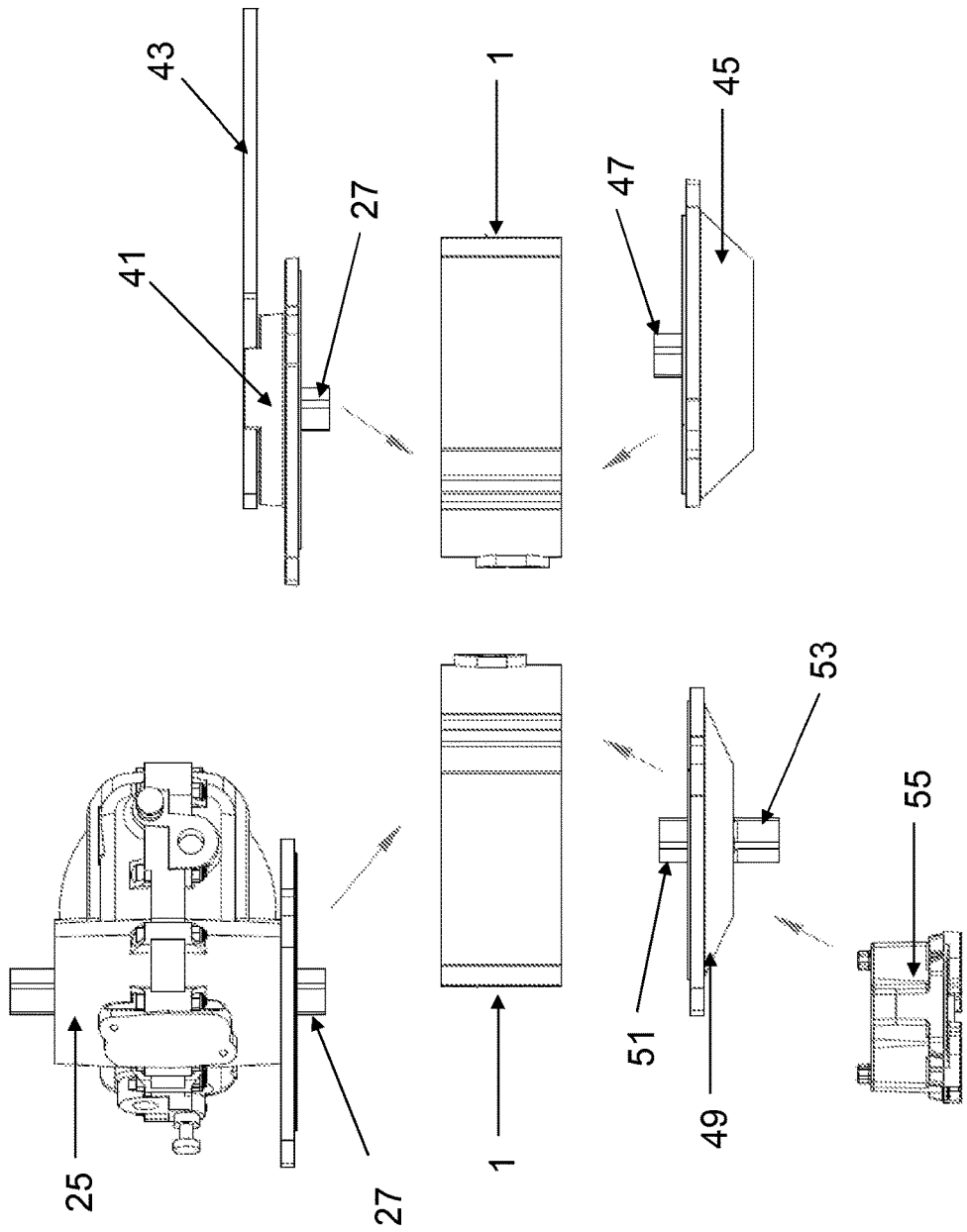
FIG. 9 is a schematic illustration of example uses of a spring return device according to an embodiment of the present invention.

FIG. 9 illustrates some example uses of the spring return device 1 according to this embodiment. As shown in FIG. 9, the spring return device 1 can be coupled to either a powered actuator 25 or to a manual actuator 41, both of which have rotary drive shafts 27. The powered actuator 25 uses power, such as electrical, pneumatic or hydraulic power, to apply a torque to the rotary drive shaft 27. The manual actuator 41 has a handle 43 for manually applying a torque to the rotary drive shaft 27.

Irrespective of the type of actuator 25, 41, the device 1 may be engaged with an adaptor 45 having a male coupling part 47 for engaging with an opening of the device 1 and also having a female coupling part for use in rotationally driving a mechanical device such as a valve (female drive option). The adaptor 45 may therefore convert a female coupling part of the drive coupling 9 to a further female coupling part having a different size and/or shape, wherein the size and shape of the further female coupling part are determined based on the characteristics of the mechanical device the further female coupling part is intended to rotationally drive (for example a size and shape of a rotatable drive shaft of the mechanical device).

Alternatively, the device 1 may be engaged with an adaptor 49 having a first male coupling part 51 for engaging with an opening of the device 1 and also having a second male coupling part 53 for use in rotationally driving a mechanical device such as a valve (male drive option). The adaptor 49 may therefore convert a female coupling part of the drive coupling 9 to a male coupling part, wherein the size and shape of the male coupling part are determined based on the characteristics of the mechanical device the male coupling part is intended to rotationally drive (for example a size and shape of a rotatable opening or bore of the mechanical device).

A further adaptor 55 could also be provided to convert the second male coupling part 53 to a female coupling part for use in rotationally driving a mechanical device.

As discussed above, because the first and second openings 11, 13 of the drive coupling 9 are the same, the device 1 can be coupled to either of the actuators 25, 41 and either of the two adaptors 45, 49 in either of two inverted (reversed) configurations.

Thus, there is significant freedom in how the device 1 according to the present embodiment can be used.

Of course, as discussed above, in other uses the spring return device 1 may be used with other types of adaptor, or without any adaptors at all.

As will be understood by the skilled person, many modifications can be made to the embodiments described above while still remaining within the scope of the appended claims.

For example, the locking mechanism may be different to that described above. For example, a different type of locking member may be used in place of the locking plate 15. Also, a different mechanism may be provided for moving the locking tab 19 axially to engage the locking plate 15, for example an axially sliding actuator in place of a rotating actuator. Furthermore, the engagement between the locking tab 19 and locking plate 15 may be different. For example, the locking tab 19 may engage with one or more protrusions or ridges on an underside of the locking plate 15 instead of being received in an opening 17 of the locking plate 15. Furthermore, a different type of locking element may be used in place of a locking tab 19, for example a rod or a pin.

In other embodiments, it may not be necessary to provide the adaptor 29 with the device 1. Instead, an adaptor may be provided on a drive shaft of a mechanical device that is to be driven, or the drive shaft of the mechanical device may be configured to engage with the opening of the drive coupling 9 directly without the need for an adaptor.

In other embodiments, the openings 11, 13 may not have the same size and/or shape. Instead, one or more adaptors may be provided where necessary to adapt the sizes and/or shapes of the openings 11, 13 to the relevant drive parts in one or both of the inverted configurations of the device 1.

In addition to the advantages of the present invention discussed above, embodiments of the present invention have any one or more of the following advantages:

1. The integral locking mechanism means the spring return device can be easily removed in situ (in the 'field') without requiring special tools or parts;
2. The spring return device has a truly field reversible action from clockwise to anti-clockwise and visa-versa;
3. The assembly costs are lower than existing reversible spring return devices;
4. A quicker assembly time when fitting the spring return device to an actuator;
5. Lower stocking costs for distributors;
6. The spring return device is easily adaptable through the use of different adaptors or through the provision of different versions with different rotatable drive couplings (e.g. with different size/shape coupling portions);
7. The overall size of the spring return device is smaller;
8. Markings can be used to show if the spring is locked for safe spring removal;
9. The possibility of providing different types of output drive, e.g. using adaptors or different types of rotatable drive coupling;
10. The spring return device can be more easily fitted or integrated into special purpose machines.

The invention claimed is:

1. A spring return device comprising:
   a rotatable drive coupling configured for releasably engaging a rotatable drive part on a first side of the device and configured for releasably engaging a rotatable drive part on an opposite second side of the device;
   a spring engaged with the drive coupling; and
   a retainer that retains the spring;
   wherein:
   rotation of the drive coupling in a first direction relative to the retainer causes mechanical energy to be stored in the spring;
   the spring return device comprises a locking mechanism that is actuatable between a first state in which rotation of the drive coupling relative to the retainer is allowed and a second state in which rotation of the drive coupling relative to the retainer is prevented;
   the drive coupling has a coupling part on the first side thereof for releasably engaging a rotatable drive part and a coupling part on the second side thereof for releasable engaging a rotatable drive part;
   the coupling part on the first side comprises a first opening for engaging a rotatable drive shaft; and
   the coupling part on the second side comprises a second opening for engaging a rotatable drive shaft.

2. The spring return device according to claim 1, wherein the locking mechanism comprises:
   a locking member that rotates with the drive coupling; and
   a locking element that is releasably engageable with the locking member to prevent rotation of the locking member.

3. The spring return device according to claim 2, wherein the locking member comprises a locking plate.

4. The spring return device according to claim 2, wherein:
the locking member has an opening; and
the locking element is releasably engageable with the locking member by the locking element being moveable to be received in the opening.

5. The spring return device according to claim 4, wherein the opening comprises a hole or a slot in the locking member.

6. The spring return device according to claim 4, wherein the locking member has a plurality of openings in which the locking element is receivable.

7. The spring return device according to claim 6, in which the locking member is a locking plate, wherein the plurality of openings are arranged around a periphery of the locking plate.

8. The spring return device according to claim 2, wherein the locking member is at an axial end of the spring return device.

9. The spring return device according to claim 2, wherein the locking element comprises a locking pin or a locking tab.

10. The spring return device according to claim 2, wherein the locking element is mounted on the retainer.

11. The spring return device according to claim 10, wherein the locking mechanism comprises a locking element actuator mounted on the retainer for actuating the locking element to engage the locking member.

12. The spring return device according to claim 11, wherein the locking element actuator is rotatable to move the locking element in an axial direction to engage the locking member.

13. The spring return device according to claim 12, wherein the locking element actuator comprises a rotatable shaft having an eccentric protrusion at an end thereof that is received in a slot of the locking element, whereby rotation of the rotatable shaft causes axial movement of the locking element.

14. The spring return device according to claim 11, wherein at least part of the locking element actuator is exposed at a side face of the retainer so that it is operable by a user of the spring return device.

15. The spring return device according to claim 1, wherein the retainer comprises a band, ring, or housing substantially surrounding the spring.

16. The spring return device according to claim 1, wherein the retainer comprises a spring retaining screw that is engageable with the spring to retain the spring.

17. The spring return device according to claim 1, wherein the spring comprises a helical torsion spring.

18. The spring return device according to claim 1, wherein the spring comprises a clock-spring.

19. An apparatus comprising:
the spring return device according to claim 1; and
a further device comprising a rotatable drive part, wherein the drive part is engaged with the drive coupling of the spring return device.

20. The apparatus according to claim 19, wherein the further device is a driver mechanism and the rotatable drive part is a rotatable driver part of the driver mechanism.

21. The apparatus according to claim 20, wherein the driver mechanism comprises a powered rotary actuator.

22. The apparatus according to claim 21, wherein the powered rotary actuator comprises a pneumatic rotary actuator, or an electrical rotary actuator, or a hydraulic rotary actuator.

23. The apparatus according to claim 20, wherein the driver mechanism comprises a manually operated rotary actuator.

24. The apparatus according to claim 20, wherein the apparatus further comprises a mechanical device having a rotatable driven part, wherein the rotatable driven part is engaged with the drive coupling on an opposite side of the device to the rotatable driver part, so that the rotatable driver part and the rotatable driven part are coupled by the drive coupling.

25. The apparatus according to claim 24, wherein the rotatable driven part is engaged with the drive coupling through a rotatable connecting part that is coupled to the rotatable driven part and to the drive coupling.

26. The apparatus according to claim 24, wherein the rotatable driven part is engaged with the drive coupling through an adaptor that converts:
a male coupling part of the drive coupling to a female coupling part; or
a female coupling part of the drive coupling to a male coupling part; or
a male coupling part of the drive coupling to a male coupling part having a different size and/or shape; or
a female coupling part of the drive coupling to a female coupling part having a different size and/or shape.

27. A method of reversing the direction of operation of a spring return device in an apparatus according to claim 19, wherein the method comprises:
actuating the locking mechanism from the first state in which rotation of the drive coupling relative to the retainer is allowed to the second state in which rotation of the drive coupling relative to the retainer is prevented;
disengaging the rotatable drive part from the drive coupling;
inverting the spring return device so that an opposite side of the spring return device faces the further device;
engaging the rotatable drive part with the drive coupling; and
actuating the locking mechanism from the second state to the first state.

28. The method according to claim 27, in which the apparatus comprises the mechanical device, wherein the method further comprises:
after actuating the locking mechanism from the first state to the second state and before inverting the spring return device, disengaging the rotatable driven part from the drive coupling; and
after inverting the spring return device and before actuating the locking mechanism from the second state to the first state, engaging the rotatable driven part with the drive coupling.

* * * * *